Patented Aug. 12, 1952

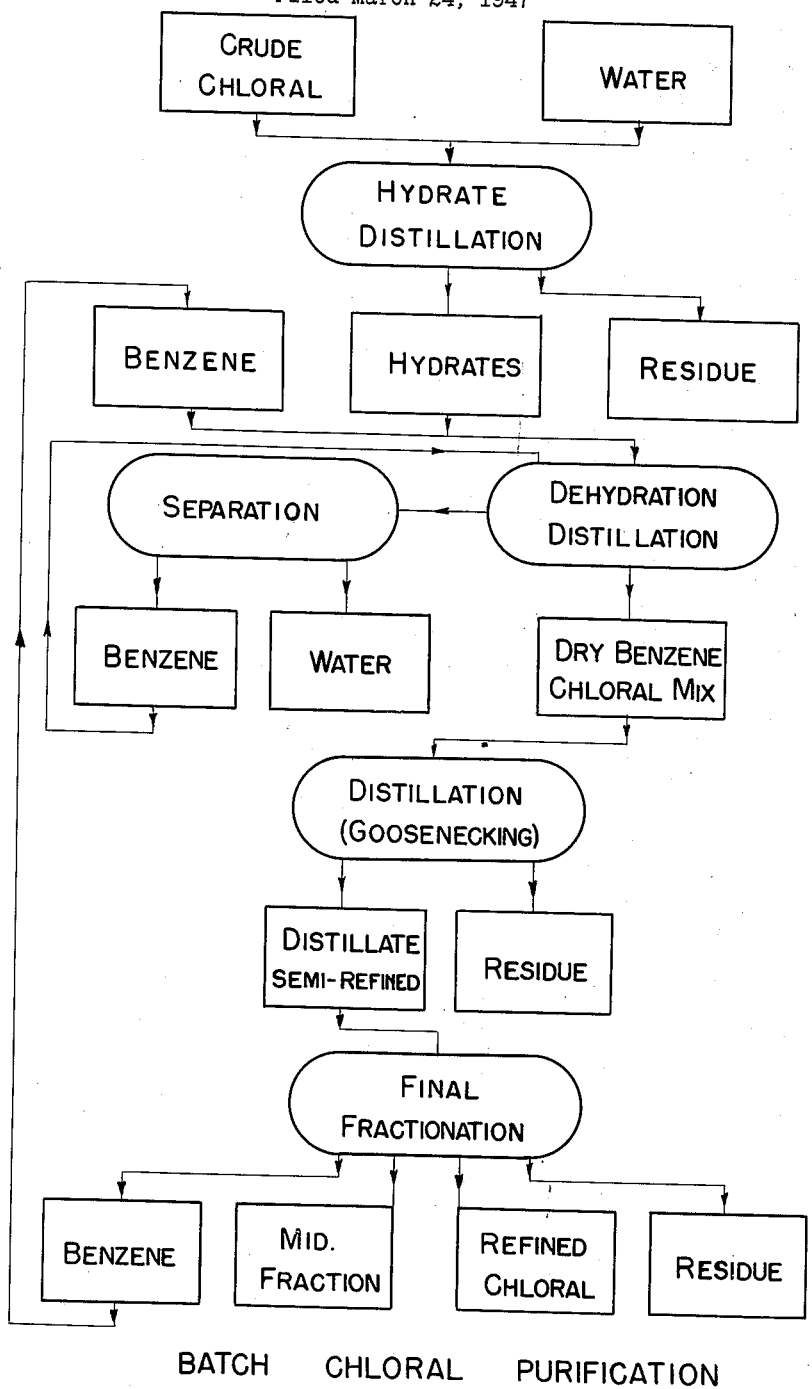

2,606,864

UNITED STATES PATENT OFFICE 2,606,864

PROCESS OF REFINING CHLORAL

William Thompson Cave, Oxford, England, and James H. Alexander and James A. McCoubrey, Shawinigan Falls, Quebec, Canada, assignors to Shawinigan Chemicals Limited, Montreal, Quebec, Canada, a corporation of Canada Application March 24, 1947, Serial No. 736,854

11 Claims. (Cl. 202—42)

This invention relates to the refining of crude chloral (trichloracetaldehyde) produced by the chlorination of acetaldehyde, or its polymers, and containing impurities such as water, hydrochloric acid, dichloracetaldehyde, butylchloral (alphadichlor-betamonochlor-butyraldehyde), acetic acid and, probably, chlorinated derivatives of acetic acid. The primary object of the invention is to provide a process of refining crude chloral made as aforesaid and containing any or all of the aforementioned impurities and of producing chloral practically free from acid and other undesirable byproducts formed during the production of the crude chloral. A further object is to produce refined chloral which will be stable during storage. A still further object is to provide a refining process which will be less expensive to operate and more convenient in operation than the known processes.

Crude chloral has heretofore been refined by heating and scrubbing or washing with sulphuric acid, separating the acidic chloral by decantation and neutralizing it by distilling with chalk, sodium carbonate or bicarbonate, and finally rectifying the chloral by fractionation. In some processes the neutralizing step has been omitted and the sulphuric acid has been removed by decantation only. In either case, the resulting semi-refined chloral still contains appreciable amounts of hydrochloric acid, acetic acid, chlorinated derivatives of acetic acid, butylchloral and other impurities. At best, the dehydration with sulphuric acid does not remove all the water, unless very large quantities of acid are used, since the sulphuric acid cannot be recycled. In any event, the consumption of sulphuric acid is high, as it is usually uneconomical to reconcentrate the diluted acid. Moreover, concentrated sulphuric acid is inconvenient to handle on a large scale.

With regard to the term "crude chloral" as herein used, it is to be understood that when this is prepared in presence of water, as is usually the case when the crude is prepared by chlorination of acetaldehyde or its polymers, the chloral, the butylchloral and the dichloracetaldehyde are present in the form of their hydrates.

In its broadest aspect, the invention consists in separating such of hydrochloric and acetic acids and chlorinated derivatives of acetic acid as are present from the remainder of the crude by fractional distillation of the crude with water, dehydrating the resulting mixture of such of the hydrates of chloral, butylchloral and dichloracetaldehyde as are present by azeotropic distillation, and separating refined chloral from the dehydrated mixture and other impurities by fractional distillation.

More particularly, the invention consists in the features and combinations of features herein disclosed, together with all such modifications thereof and substitutions of equivalents therefor as are within the scope of the appended claims.

According to one manner of practising the invention, crude chloral containing the abovementioned impurities is first fractionally distilled with at least sufficient water to prevent more than traces of hydrochloric and acetic acids and chlorinated derivatives of acetic acid from passing into the distillate. This step is hereinafter termed "hydrate distillation." The resulting solution, being a mixture of chloral hydrate, butylchloral hydrate and dichloracetaldehyde hydrate, is dehydrated by azeotropic distillation and the resulting chloral-butylchloral-dichloracetaldehyde mixture is distilled without fractionation (goosenecked) to separate the chloral and the dichloracetaldehyde from the higher boiling butylchloral. The resulting semi-refined chloral is finally fractionated to produce a refined chloral. All the steps after the hydrate distillation are carried out with exclusion of oxygen, preferably under a nitrogen atmosphere.

The azeotrope forming agent now found most satisfactory is benzene, as it possesses the desirable properties of stability, water removing efficiency, ready separability from chloral and easy recovery for re-use.

The process may be carried out entirely as a batch process; or the first, or hydrate, distillation may be carried out continuously while the remaining steps are carried out batchwise. Alternatively, by using additional fractional distillation, the entire process may be carried out continuously. When possible, continuous operation is preferred because of the inherent savings in time, labour and materials handling. The possibility of using continuously operating distillations for the several steps of the process depends to a considerable extent on the amount and kind of impurities in the crude chloral. Crudes containing less than about 2% of acetic acid are readily processed by a continuous hydrate distillation, the acid being removed in the bottoms. When larger percentages of acetic acid are present in the crude, a batch hydrate distillation is preferred to effect separation of the acid and its derivatives from the chloral hydrate.

To obtain a stable product, the chloral must be kept from contact with oxygen during the refining process. This is easily achieved by venting the system to an oxygen free atmosphere which is inert to chloral, during those steps of the process subsequent to the hydrate distillation. Chloral hydrate is stable in the presence of oxygen, wherefore the hydrate distillation need not be so protected.

The features and advantages of the invention will be more apparent by reference to the accompanying drawing and the following description.

The drawing is a flow sheet illustrating a batch hydrate distillation, batch azeotropic dehydration distillation and goosenecking, and batch final fractionation.

One form of apparatus which has been found suitable for carrying out the process comprises a pair of 500-gallon glass lined kettles for the hydrate distillation and the dehydration distillation, respectively, each having a fractionating column 24 feet high and 2 feet internal diameter, packed to a height of 22 feet with one-inch berl saddles; and a 300 gallon glass lined kettle for the final rectification, having a fractionating column 27 feet high and 29 inches internal diameter, packed to a height of 25 feet with one-inch Raschig rings; together with the necessary separating and holding tanks, conduits and circulating means. Each of the columns has a fractionating efficiency of about 14 theoretical plates.

The following examples are illustrative of the practice of the invention but it will be understood the invention is not limited to the details thereof.

*Example 1.*—A charge of 335 gallons of crude chloral containing approximately 40% chloral was fractionally distilled with a total of 265 gallons of water, the water being added as necessary during the distillation to keep the concentration of hydrochloric acid below 15% by weight of the free water in the still. While chloral hydrate solution was being drawn off, the column was operated at a reflux ratio of 2:1. The draw off was taken as chloral hydrate solution until its chloral content fell below 10%, after which the column was operated at a reflux ratio of 1:1 and the draw off was used as dilution water in the next batch. The distillate also contained dichloracetaldehyde hydrate and butylchloral as butylchloral hydrate, this last having approximately the same boiling point as chloral hydrate. The residue contained practically all the relatively higher boiling acids, acetic, chlorinated acetic and hydrochloric. The distillate was dehydrated by azeotropic distillation with about 60 gallons of benzene which is an entrainer forming a minimum boiling azeotrope with water, the condensate from the draw off being separated into two layers, benzene and water, in a decanter. The benzene was returned to the top of the fractionating column as reflux. Most of the water, which contained little or no chloral, was discarded to waste. The last 5% of the water removed, which contained some chloral, was collected for use as dilution water in the hydrate distillation of another batch. (In practice, the refluxing is usually continued until the water removal rate falls below an economical rate, for instance, below one gallon per hour, or lower, for a charge as in this example.) The dehydrated chloral- butylchloral - dichloracetaldehyde - benzene mixture was then distilled without fractionation (goosenecked) to separate most of the butylchloral, which was left as residue, and the whole distillate was taken as semi-refined chloral.

A 250-gallon charge of semi-refined chloral, as above, was fractionated at a 10:1 reflux ratio until the temperature at the draw off reached 88° C. The distillate recovered at this point was benzene, which was collected for use in a subsequent dehydration step. A small middle fraction distilling over in the range 88° C., to 97° C., was collected at a reflux ratio of 10:1. Refined chloral boiling over at 97° C., was collected at a reflux ratio of 3:1. The middle fraction was collected for addition to the final fractionation of a subsequent batch. The residues of successive batches, being material boiling at a temperature above 98° C., were allowed to accumulate in the still pot for further recovery of the chloral content. During all the steps after the hydrate distillation, oxygen was excluded, the system being vented to an atmosphere of dry nitrogen and the refined chloral being collected and stored under dry nitrogen.

In the operation of the process by batch distillation, as described in this example, crude chloral batches containing about 30% to 40% water, 10% to 12% hydrochloric acid, 0.1% to 7% acetic acid and chlorinated derivatives, 1% to 5.5% butylchloral and 1% to 3% dichloracetaldehyde, will have, on the average, 99.9% or more of the water removed, 99.7% or more of the hydrochloric acid removed, 96% to 99.4% of the acetic acid and its derivatives removed and 63% to 75% of the butylchloral and dichloracetaldehyde removed.

Alternatively, a rough separation of benzene from chloral may be obtained by taking the first fraction that distills up to a temperature of 88° C., in the goosenecking as benzene for recycling to the next batch of hydrate for distillation. If this benzene fraction is separated, the following fraction that distills above about 88° C., until a maximum temperature is reached (after which the temperature soon falls) can be taken as semi-refined chloral. The residue left in the kettle then contains most of the butylchloral.

*Example 2.*—The process was carried out substantially as in Example 1 excepting that in the hydrate distillation, crude chloral containing about 46.7% of chloral, and water were fed continuously into a fractionating column. Chloral hydrate in solution and other hydrates in solution, as in Example 1, were drawn off continuously at the top of the column, and the bottoms were withdrawn continuously from the still pot. The chloral hydrate and other hydrates were fed, batchwise, to a dehydration still and dehydrated by azeotropic distillation with benzene. Batches of the dehydrated chloral, containing the remaining impurities, were fed into a final fractionating still and fractionated. In the dehydration and in the final fractionation, the system was vented to an atmosphere of dry nitrogen. The chloral fraction taken in the final fractionation was withdrawn at a constant temperature (97.2° C.), an excellent criterion of its chemical purity.

It was found that impurities were removed from the crude to the following extent: Water, 99.98%; hydrochloric acid, 99.9%; acetic acid and chlorinated derivatives, 99.2%; butylchloral and dichloracetaldehyde, 83.7%.

*Example 3.*—The process is carried out substantially as in Example 2, except that the dehydration distillation is operated as a continuous step by feeding hydrate from the continuous hydrate distillation into the dehydration column and withdrawing dehydrated residue continuously from the dehydration still. The dehydrated material may be fed directly to the fractionation step, omitting the goosenecking step.

So far as we are aware, azeotropic distillation has never been used as a dehydration step in refining crude chloral nor has removal of acids from crude chloral preceded dehydration. By first eliminating the acids, the dehydration and the separation of impurities are facilitated. After removal of acids, the material being refined is much less corrosive and more easily handled. Only the equipment required for the first distillation is subjected to highly corrosive acid conditions when this process is used.

From the foregoing disclosure, it will be evident to those skilled in the art that the advantages of this invention are material. It is difficult to remove acidic impurities completely from crude chloral after dehydration, which is the procedure employed in former processes. The removal of acidic impurities prior to dehydration, as in the present invention, is much simpler and more efficacious. The feature of excluding oxygen during all steps of the refining after the hydrate distillation is important in that, by preventing oxidation of the chloral, regeneration of hydrochloric acid is prevented during the later steps of the refining and during storage of the refined chloral. The presence of hydrochloric acid in the refined chloral is undesirable because of the polymerization it induces. Chloral refined by the process of this invention, with exclusion of oxygen, is a more stable product than has been produced heretofore and is more nearly chemically pure than chloral refined by known commercial processes. Moreover, the use of benzene instead of sulphuric acid is much superior in that benzene is easier to handle and there is a negligible loss of benzene as compared with the consumption of sulphuric acid.

In the following claims, the term "acetaldehyde" is to be understood and interpreted as a generic term embracing both the monomeric form and the polymeric paraldehyde form thereof.

Having thus described our invention, we claim:

1. A process of refining crude chloral prepared by chlorination of aqueous acetaldehyde and containing impurities such as water, hydrochloric acid, acetic acid and chlorination products thereof, butylchloral and dichloracetaldehyde, which process comprises; first separating chloral, butylchloral and dichloracetaldehyde as hydrates from hydrochloric and acetic acids and chlorination products of acetic acid by fractional distillation with water in amount sufficient to keep the concentration of hydrochloric acid below about 15% by weight of the free water present; dehydrating the resulting chloral-butylchloral-dichloracetaldehyde hydrate mixture by azeotropic distillation in the presence of an entrainer forming a minimum boiling azeotrope with water; and finally separating refined chloral from the dehydrated mixture by fractional distillation.

2. A process of refining crude chloral prepared by chlorination of aqueous acetaldehyde and containing impurities such as water, hydrochloric acid, acetic acid and chlorination products thereof, butylchloral and dichloracetaldehyde, which process comprises; first fractionally distilling the crude chloral with water while maintaining the water present always in an amount to maintain the concentration of the acids sufficiently low to prevent more than traces of hydrochloric and acetic acids and chlorination products of acetic acid from passing over with the chloral-butylchloral-dichloracetaldehyde hydrate distillate; azeotropically distilling the aforesaid hydrate mixture in the presence of an entrainer forming a minimum boiling azeotrope with water for separation of water from semi-refined chloral; and finally fractionally distilling the semi-refined chloral.

3. A process of refining crude chloral prepared by chlorination of aqueous acetaldehyde and containing impurities such as water, hydrochloric acid, acetic acid and chlorination products thereof, butylchloral and dichloracetaldehyde, which process comprises; separating chloral, butylchloral and dichloracetaldehyde as hydrates from hydrochloric and acetic acids and chlorination products of acetic acid by fractional distillation with water in amount sufficient to keep the concentration of hydrochloric acid below about 15% by weight of the free water present; dehydrating the resulting chloral-butylchloral-dichloracetaldehyde hydrate mixture by azeotropic distillation with benzene; and finally separating refined chloral from the dehydrated mixture by fractional distillation.

4. A process of refining crude chloral prepared by chlorination of aqueous acetaldehyde and containing impurities such as water, hydrochloric acid, acetic acid and chlorination products of acetic acid, butylchloral and dichloracetaldehyde, which process comprises; first fractionally distilling the crude chloral with water while maintaining the water present always in an amount to maintain the concentration of the acids sufficiently low to prevent more than traces of hydrochloric and acetic acids and chlorination products of acetic acid from passing over with the chloral-butylchloral-dichloracetaldehyde hydrate distillate; azeotropically distilling the aforesaid hydrate mixture with benzene for separation of water from semi-refined chloral; and finally fractionally distilling the semi-refined chloral.

5. A process of refining crude chloral prepared by chlorination of aqueous acetaldehyde and containing impurities such as water, hydrochloric acid, acetic acid and chlorination products thereof, butylchloral and dichloracetaldehyde, which process comprises; first fractionally distilling the crude chloral with water while maintaining the water present always in an amount to maintain the concentration of the acids sufficiently low to prevent more than traces of hydrochloric and acetic acids and chlorination products of acetic acid from passing over with the chloral-butylchloral-dichloracetaldehyde hydrate distillate; dehydrating the hydrate mixture by azeotropic distillation with benzene; distilling the dehydrated mixture for separation therefrom of butylchloral; and finally fractionating the resulting semi-refined chloral for separation of refined chloral from the remaining constituents of the mixture.

6. A process of refining crude chloral prepared by chlorination of aqueous acetaldehyde and containing impurities such as water, hydrochloric acid, acetic acid and chlorination products thereof, butylchloral and dichloracetaldehyde, which process comprises; first fractionally distilling the crude chloral with water while maintaining the water present always in an amount to maintain the concentration of the acids sufficiently low to prevent more than traces of acidic constituents of the crude from passing over with the distillate; dehydrating the distillate by azeotropic distillation in the presence of an entrainer forming a minimum boiling azeotrope with water; distilling the dehydrated distillate to separate semi-refined chloral from butylchloral; and finally fractionating the semi-refined chloral for separation of refined chloral from the remaining constituents of the mixture.

7. A process according to claim 2, in which oxygen is excluded after the first, or hydrate, distillation.

8. A process according to claim 2, in which all the steps after the first, or hydrate, distillation are carried out under an atmosphere of nitrogen.

9. A process according to claim 2, in which the hydrate distillation is continuous and the subsequent steps are carried out batchwise.

10. A process according to claim 2, in which the hydrate distillation and the dehydration distillation are continuous and the final fractionation is carried out batchwise.

11. A process of refining crude chloral prepared by chlorination of aqueous acetaldehyde in accordance with claim 2 wherein a chloral containing portion of the removed water is recycled and used as dilution water in subsequent hydrate distillation.

WILLIAM THOMPSON CAVE.
JAS. H. ALEXANDER.
JAMES A. McCOUBREY.

REFERENCES CITED

The following references are of record in the file of this patent:

UNITED STATES PATENTS

| Number | Name | Date |
|---|---|---|
| 774,151 | Besson | Nov. 8, 1904 |
| 1,676,735 | Keyes | July 10, 1928 |
| 1,774,507 | Ernst et al. | Sept. 2, 1930 |
| 1,940,699 | Ricard et al. | Dec. 26, 1933 |
| 2,194,851 | Guinot | Mar. 26, 1946 |
| 2,462,444 | Weiss | Feb. 22, 1949 |
| 2,478,741 | Brothman | Aug. 9, 1949 |